(12) United States Patent
Zaitman et al.

(10) Patent No.: US 12,411,810 B1
(45) Date of Patent: Sep. 9, 2025

(54) EFFICIENT REMOVAL OF STALE ENTRIES FROM ON-DRIVE DEDUPLICATION HASH TABLES USING HASH PREFIX INDEXING

(71) Applicant: Dell Products L.P., Round Rock, TX (US)

(72) Inventors: Amit Zaitman, Shavey Shomron (IL); Uri Shabi, Tel Mond (IL); Alexander Shknevsky, Fair Lawn, NJ (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/806,834

(22) Filed: Aug. 16, 2024

(51) Int. Cl.
  *G06F 16/174* (2019.01)
  *G06F 16/14* (2019.01)

(52) U.S. Cl.
  CPC ........ *G06F 16/1748* (2019.01); *G06F 16/152* (2019.01)

(58) Field of Classification Search
  CPC ............... G06F 16/1748; G06F 16/152
  See application file for complete search history.

(56) References Cited

U.S. PATENT DOCUMENTS

| | | | |
|---|---|---|---|
| 8,892,529 B2 * | 11/2014 | Liu | G06F 3/0641 |
| | | | 707/692 |
| 11,080,145 B1 | 8/2021 | Andreyev | |
| 11,144,533 B1 * | 10/2021 | Dalamatov | G06F 3/0641 |
| 11,151,049 B2 | 10/2021 | Meiri et al. | |
| 11,151,056 B2 | 10/2021 | Shveidel et al. | |
| 11,301,427 B2 | 4/2022 | McIlroy et al. | |
| 11,366,750 B2 | 6/2022 | Soukhman et al. | |
| 11,467,963 B2 | 10/2022 | David et al. | |
| 11,593,327 B2 | 2/2023 | Dalmatov | |
| 11,720,484 B2 | 8/2023 | Harel et al. | |
| 2018/0253255 A1 * | 9/2018 | Jain | G06F 3/0673 |

* cited by examiner

*Primary Examiner* — Tyler J Torgrimson
(74) *Attorney, Agent, or Firm* — BainwoodHuang

(57) ABSTRACT

Techniques for achieving efficient removal of stale index entries from on-drive deduplication indexes using hash prefix indexing. The techniques include providing an on-drive dedupe index that includes a plurality of index entries. Each index entry includes a hash value of a data page, and an address associated with a storage location of the data page. Each index entry is assigned to a bucket defined by a respective hash prefix. The techniques include, for each data page associated with a reference count decremented to zero, logging a hash prefix and a storage address of the data page. The techniques include, for each bucket, constructing an address bag, storing, in the address bag, logged addresses whose corresponding hash prefix is the same as the respective hash prefix defining the bucket, and removing, from the bucket, each stale index entry that includes an address matching one of the addresses in the address bag.

20 Claims, 7 Drawing Sheets

EFFICIENT REMOVAL OF STALE ENTRIES FROM ON-DRIVE DEDUPLICATION HASH TABLES USING HASH PREFIX INDEXING

BACKGROUND

Storage systems include storage processors coupled to arrays of storage drives, such as solid state drives (SSDs) and hard disk drives (HDDs). The storage processors receive and service storage input/output (IO) requests (e.g., write requests, read requests) from storage client computers ("storage clients"), which send the write requests and read requests to the storage systems over a network. The storage IO requests specify datasets, such as data pages, data blocks, data files, or other data elements, to be written to or read from logical units (LUs), volumes (VOLs), filesystems, or other storage objects maintained on the storage drives. The storage systems perform data reduction processes, including data deduplication ("dedupe") processes. A storage system maintains a dedupe index that associates content-based signatures or digests (e.g., hash values) of datasets with addresses (e.g., virtual addresses) associated with locations where the datasets are stored. In response to receiving a write request specifying a new dataset to be written to a storage object, a storage processor applies a hash function to the new dataset to obtain a hash value, and performs a lookup into the dedupe index to identify a hash value that matches the obtained hash value, if any. Upon identifying a matching hash value in the dedupe index, the storage processor effectuates storage of the new dataset using the virtual address of a corresponding previously stored dataset, thereby avoiding redundant storage of duplicate datasets in the storage systems.

SUMMARY

Storage systems that perform dedupe processes can maintain dedupe indexes across several storage levels, including a volatile ("in-memory") storage level and a persistent ("on-drive") storage level. In response to a dedupe index at an in-memory storage level ("in-memory dedupe index") reaching a specified fullness threshold, "dirty" index entries (i.e., index entries not persisted at an on-drive storage level) can be destaged from the in-memory dedupe index to a dedupe index at the on-drive storage level ("on-drive dedupe index"). The destaged index entries can be deleted or removed from the in-memory dedupe index, and merged with index entries in the on-drive dedupe index. Having destaged the dirty index entries to the on-drive dedupe index, the destaged index entries can be marked as "clean".

In a storage system, stored datasets (e.g., data pages) can be invalidated, such as in a reference count decrement process, resulting in "stale" index entries in an on-drive dedupe index. However, maintaining stale index entries in on-drive dedupe indexes can be detrimental to the effectiveness of dedupe processes. For example, drive storage space occupied by an on-drive dedupe index may reach its full capacity due to the presence of stale index entries, often requiring older index entries to be evicted upon arrival of newer index entries. If the evicted index entries were not stale, but, in fact, were valid index entries, then subsequent dedupe opportunities may be missed, negatively impacting the performance of data reduction in the storage system.

In a typical scenario, to delete or remove stale index entries from an on-drive dedupe index, each invalid data page can be read at its virtual address, decompressed (if necessary), a hash function can be applied to the invalid data page to obtain a hash value, and the full hash value and virtual address of the invalid data page can be stored or logged in an in-memory dedupe log. During destaging of dirty index entries to the on-drive dedupe index, the dedupe log can be traversed, and each full hash value encountered in the traversal can be compared with index entries in the on-drive dedupe index to identify matching pairs of hash values. For each matching hash value pair, a corresponding stale index entry can be deleted or removed from the on-drive dedupe index. However, reading invalid data pages from storage, decompressing (if necessary) the invalid data pages, obtaining corresponding hash values, and storing or logging the full hash values and virtual addresses in an in-memory dedupe log can be both processing and memory resource intensive, especially in large scale systems that perform frequent data modifications and deletions. In another typical scenario, rather than having to obtain hash values of invalid data pages, the full hash values can be stored on a per data page basis. However, while this other scenario may be less taxing on processing resources, it may be less efficient in its use of memory and/or storage resources. Moreover, depending on their storage locations, increased IO operations may be required to access the hash values of the invalid data pages.

Techniques are disclosed herein for achieving efficient removal of stale index entries from on-drive dedupe indexes using hash prefix indexing. Storage systems that perform the disclosed techniques can maintain dedupe indexes across several storage levels, including an in-memory storage level and an on-drive storage level. The storage systems can implement a namespace layer and a physical layer, as well as multiple layers of indirection for accessing stored datasets in the physical layer. The multiple layers of indirection can include a mapping layer that maintains a plurality of leaf pointers, and a virtualization layer that maintains a plurality of virtual data structures. Each leaf pointer in the mapping layer can point to a virtual data structure in the virtualization layer. Each virtual data structure can contain virtual descriptor information, such as an address ("virtual address") that points to a location of a stored dataset in the physical layer, a reference count for keeping track of the number of leaf pointers that point to the virtual data structure, digest (e.g., hash prefix) information, and so on. In response to an in-memory dedupe index reaching a specified fullness threshold, the storage systems can destage "dirty" index entries from the in-memory dedupe index to an on-drive dedupe index. The storage systems can merge the destaged index entries with index entries in the on-drive dedupe index, delete or remove the destaged index entries from the in-memory dedupe index, and mark the destaged index entries in the on-drive dedupe index as "clean".

Over time, some datasets (e.g., data pages) stored in a storage system can be determined invalid, resulting in stale index entries in an on-drive dedupe index. Unfortunately, maintaining stale index entries in on-drive dedupe indexes can be detrimental to the effectiveness of dedupe processes. The disclosed techniques can be used to delete or remove stale index entries from on-drive dedupe indexes in a manner that is less resource intensive than prior techniques. In the disclosed techniques, each index entry in an on-drive dedupe index can include a content-based signature or digest (e.g., hash value) of a data page, and an address (e.g., virtual address) associated with a location in the physical layer where the data page is stored. Each hash value can be a multi-bit value (e.g., sixty-four (64) bits), in which a specified number of most significant bits (MSBs) (e.g., up to thirty-two (32) MSBs) can be designated as a prefix of the hash value ("hash prefix"). In the disclosed techniques, index entries in the on-drive dedupe index can be assigned to a plurality of bucket data structures ("bucket(s)") based on the prefixes of hash values included therein. As such, each hash prefix can uniquely identify or define a respective one of the plurality of buckets. Accordingly, each bucket of the on-drive dedupe index can contain, or otherwise be associated with, multiple index entries that include hash values with the same hash prefix (e.g., the same specified number of MSBs).

The disclosed techniques can include providing or making accessible an on-drive dedupe index that includes a plurality of index entries. Each index entry can include a hash value of a data page, and an address (e.g., virtual address) associated with a location where the data page is stored. Each hash value can have a hash prefix. Each data page can be associated with a reference count. Each index entry can be assigned to a bucket, which can be identified or defined by the prefix of the hash value included in the index entry. The disclosed techniques can include, for each data page associated with a reference count decremented to zero (0), storing or logging, in a dedupe log, the prefix of the hash value of the data page, and a corresponding virtual address associated with a location where the data page is stored. The disclosed techniques can include sequentially processing (e.g., in hash-wise order), each bucket of a plurality of buckets of the on-drive dedupe index. The disclosed techniques can include, for each bucket currently being processed, constructing, dynamically and on-demand, an address bag data structure ("address bag"), storing, in the address bag, one or more virtual addresses from the dedupe log whose corresponding hash prefix is the same as the hash prefix identifying or defining the bucket, and removing, from the bucket, each index entry that includes a virtual address matching one of the virtual addresses in the address bag. Each index entry in the on-drive dedupe index that includes a matching address in the address bag can be regarded as a stale index entry.

The disclosed techniques can reduce storage overhead associated with in-memory dedupe logs by storing or logging hash prefixes and their corresponding virtual addresses, while avoiding storing the full hash values. In addition, the disclosed techniques can reduce IO and compute operations by obtaining hash prefix information from page metadata or virtual descriptor information, avoiding the need to read data pages from storage, decompress (if necessary) the data pages, and compute their full hash values. Such advantages can be achieved through the use of small address bag data structures ("address bags"), which can be constructed dynamically and on-demand when sequentially processing buckets of index entries in an on-drive dedupe index. The addresses stored in the address bags and the hash prefixes identifying or defining the buckets of index entries allow for accurate identification and efficient deletion or removal of stale index entries from the on-drive dedupe index.

In certain embodiments, a method includes providing or making accessible an on-drive deduplication ("dedupe") index. The on-drive dedupe index includes a plurality of index entries. Each index entry includes a digest of a data page and an address associated with a location where the data page is stored. Each digest has a digest prefix. Each data page is associated with a reference count. Each index entry is assigned to a bucket data structure ("bucket") defined by a respective digest prefix. The method includes, for each data page associated with a reference count decremented to zero (0), logging, in a dedupe log, a digest prefix of the data page and a corresponding address associated with a location where the data page is stored. The method includes, for each bucket of the on-drive dedupe index: constructing, dynamically and on-demand, an address bag data structure ("address bag"); storing, in the address bag, one or more addresses from the dedupe log whose corresponding digest prefix is the same as the respective digest prefix defining the bucket; and removing, from the bucket, each index entry that includes an address matching one of the addresses in the address bag, the index entry being regarded as a stale index entry.

In certain arrangements, the method includes, having removed, from the bucket, each index entry that includes an address matching one of the addresses in the address bag, deleting or deallocating the address bag from memory.

In certain arrangements, the method includes logging, in the dedupe log, the digest prefix of the data page and a corresponding virtual address associated with the location where the data page is stored.

In certain arrangements, a destaging process includes, in response to an in-memory dedupe index reaching a specified fullness threshold, destaging the plurality of index entries from the in-memory dedupe index to the on-drive dedupe index. The constructing of the address bag, the storing of the addresses in the address bag, and the removing of the index entry from the bucket, are performed during the destaging process.

In certain arrangements, the plurality of index entries include a plurality of digests, respectively. The plurality of digests have a plurality of digest prefixes, respectively. The plurality of index entries are assigned to a plurality of buckets defined by the plurality of digest prefixes, respectively. The method includes ordering the plurality of buckets according to the plurality of digest prefixes defining the respective buckets.

In certain arrangements, the method includes performing the destaging process iteratively and sequentially across the ordered plurality of buckets.

In certain embodiments, a system includes a memory, and processing circuitry configured to execute program instructions out of the memory to provide or make accessible an on-drive deduplication ("dedupe") index. The on-drive dedupe index includes a plurality of index entries. Each index entry includes a digest of a data page and an address associated with a location where the data page is stored. Each digest has a digest prefix. Each data page is associated with a reference count. Each index entry is assigned to a bucket data structure ("bucket") defined by a respective digest prefix. The processing circuitry is configured to execute the program instructions out of the memory, for each data page associated with a reference count decremented to zero (0), to log, in a dedupe log, a digest prefix of the data page and a corresponding address associated with a location where the data page is stored. The processing circuitry is configured to execute the program instructions out of the memory, for each bucket of the on-drive dedupe index: to construct, dynamically and on-demand, an address bag data structure ("address bag"); to store, in the address bag, one or more addresses from the dedupe log whose corresponding digest prefix is the same as the respective digest prefix defining the bucket; and to remove, from the bucket, each index entry that includes an address matching one of the addresses in the address bag, the index entry being regarded as a stale index entry.

In certain arrangements, the processing circuitry is configured to execute the program instructions out of the memory, having removed, from the bucket, each index entry that includes an address matching one of the addresses in the address bag, to delete or deallocate the address bag from memory.

In certain arrangements, the processing circuitry is configured to execute the program instructions out of the memory to log, in the dedupe log, the digest prefix of the data page and a corresponding virtual address associated with the location where the data page is stored.

In certain arrangements, the processing circuitry is configured to execute the program instructions out of the memory to perform a destaging process including, in response to an in-memory dedupe index reaching a specified fullness threshold, destaging the plurality of index entries from the in-memory dedupe index to the on-drive dedupe index. The constructing of the address bag, the storing of the addresses in the address bag, and the removing of the index entry from the bucket, are performed during the destaging process.

In certain arrangements, the plurality of index entries include a plurality of digests, respectively. The plurality of digests have a plurality of digest prefixes, respectively. The plurality of index entries are assigned to a plurality of buckets defined by the plurality of digest prefixes, respectively. The processing circuitry is configured to execute the program instructions out of the memory to order the plurality of buckets according to the plurality of digest prefixes defining the respective buckets.

In certain arrangements, the processing circuitry is configured to execute the program instructions out of the memory to perform the destaging process iteratively and sequentially across the ordered plurality of buckets.

In certain arrangements, the stale index entry corresponds to a data page determined invalid, such that the system does not include any storage object having a logical address mapped to an address of the data page.

In certain arrangements, the processing circuitry is configured to execute the program instructions out of the memory to determine a size of the address bag based on a number of bits in the respective digest prefix defining the bucket.

In certain embodiments, a computer program product includes a set of non-transitory, computer-readable media having program instructions that, when executed by processing circuitry, cause the processing circuitry to perform a method including providing or making accessible an on-drive deduplication ("dedupe") index. The on-drive dedupe index includes a plurality of index entries. Each index entry includes a digest of a data page and an address associated with a location where the data page is stored. Each digest has a digest prefix. Each data page is associated with a reference count. Each index entry is assigned to a bucket data structure ("bucket") defined by a respective digest prefix. The method includes, for each data page associated with a reference count decremented to zero (0), logging, in a dedupe log, a digest prefix of the data page and a corresponding address associated with a location where the data page is stored. The method includes, for each bucket of the on-drive dedupe index: constructing, dynamically and on-demand, an address bag data structure ("address bag"); storing, in the address bag, one or more addresses from the dedupe log whose corresponding digest prefix is the same as the respective digest prefix defining the bucket; and removing, from the bucket, each index entry that includes an address matching one of the addresses in the address bag, the index entry being regarded as a stale index entry.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIG. 3a is a diagram of an exemplary on-drive dedupe index that can be implemented in the storage environment of FIG. 1, in which index entries are assigned to a plurality of bucket data structures ("buckets") identified or defined by hash prefixes included in the respective index entries;

FIG. 3b is a diagram of an exemplary address bag data structure ("address bag"), a form of which can be constructed, dynamically and on-demand, when sequentially processing the plurality of buckets of the on-drive dedupe index of FIG. 3a;

DETAILED DESCRIPTION

Techniques are disclosed herein for achieving efficient removal of stale index entries from on-drive deduplication ("dedupe") indexes using hash prefix indexing. The disclosed techniques can include providing or making accessible an on-drive dedupe index that includes a plurality of index entries. Each index entry can include a digest (e.g., hash value) of a data page, and an address (e.g., virtual address) associated with a location where the data page is stored. Each hash value can have a hash prefix. Each data page can be associated with a reference count. Each index entry can be assigned to a bucket data structure ("bucket") identified or defined by the prefix of the hash value included in the index entry. The disclosed techniques can include, for each data page associated with a reference count decremented to zero (0), storing or logging, in a dedupe log, the prefix of the hash value of the data page, and a corresponding virtual address associated with a location where the data page is stored. The disclosed techniques can include sequentially processing (e.g., in hash-wise order), each bucket of a plurality of buckets of the on-drive dedupe index. The disclosed techniques can include, for each bucket currently being processed, constructing, dynamically and on-demand, an address bag data structure ("address bag"), storing, in the address bag, one or more virtual addresses from the dedupe log whose corresponding hash prefix is the same as the hash prefix identifying or defining the bucket, and removing, from the bucket, each index entry that includes a virtual address matching one of the virtual addresses in the address bag. Each index entry in the on-drive dedupe index that includes a matching address in the address bag can be regarded as a stale index entry. The disclosed techniques allow for accurate identification and efficient deletion or removal of stale index entries from on-drive dedupe indexes.

Figure 1:
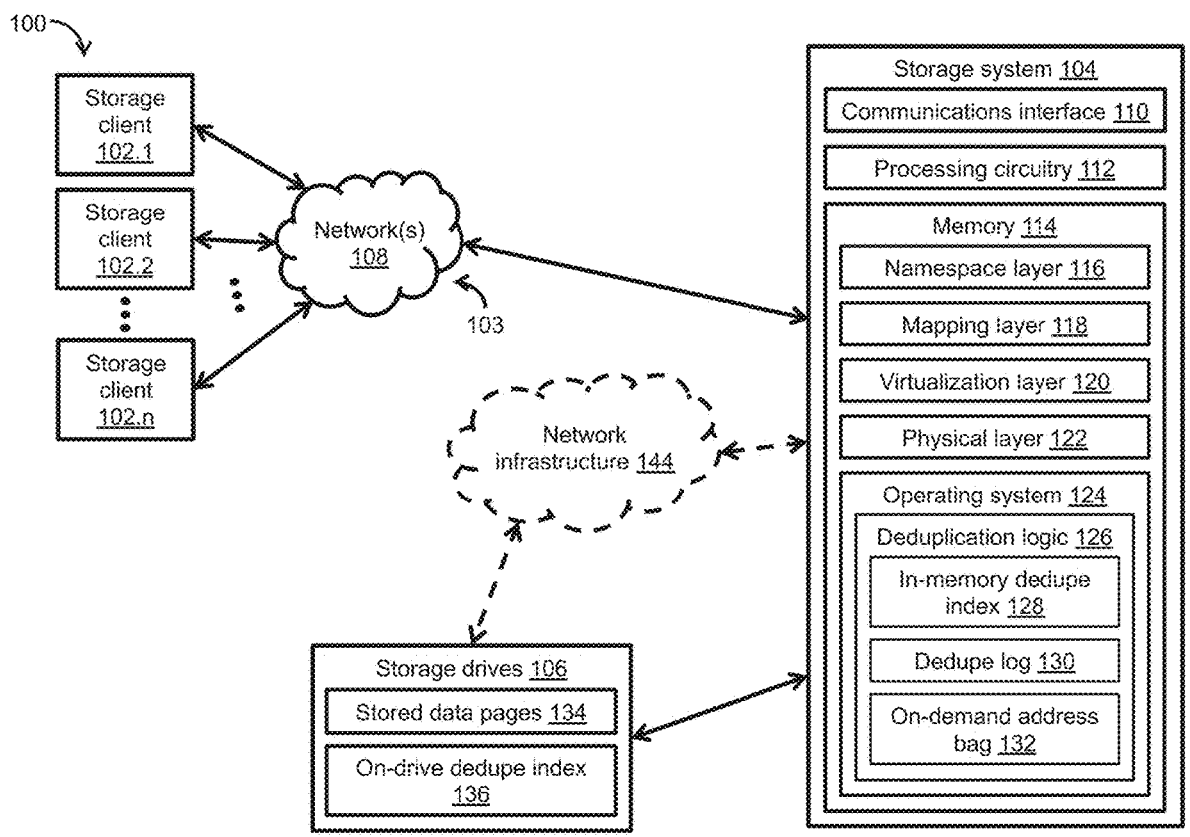
FIG. 1 is a block diagram of an exemplary storage environment, in which techniques can be practiced for achieving efficient removal of stale index entries from on-drive dedupe indexes using hash prefix indexing.

FIG. 1 depicts an illustrative embodiment of an exemplary storage environment 100 for achieving efficient removal of stale index entries from on-drive dedupe indexes using hash prefix indexing. As shown in FIG. 1, the storage environment 100 can include a plurality of storage client computers ("storage clients") 102.1, 102.2, ..., 102.n, a storage system 104, storage drives 106, and a communications medium 103 that includes at least one network 108. Each storage client 102.1, ..., 102.n can provide, over the network(s) 108, storage input/output (IO) requests (e.g., small computer system interface (SCSI) commands, network file system (NFS) commands) to the storage system 104. Such storage IO requests (e.g., write requests, read requests) can direct the storage system 104 to write and/or read datasets including data pages, data blocks, data files, or any other suitable data elements, to/from logical units (LUs), volumes (VOLs), virtual volumes (VVOLs) (e.g., VMware® VVOLs), filesystems, or any other suitable storage objects, maintained on the storage drives (e.g., solid state drives (SSDs), flash drives, hard disk drives (HDDs)) 106.

The communications medium 103 can be configured to interconnect the plurality of storage clients 102.1, ..., 102.n with the storage system 104, enabling them to communicate and exchange data and/or control signaling. As shown in FIG. 1, the communications medium 103 can be illustrated as a "cloud" to represent different network topologies, such as a storage area network (SAN) topology, a network attached storage (NAS) topology, a local area network (LAN) topology, a metropolitan area network (MAN) topology, a wide area network (WAN) topology, and so on. As such, the communications medium 103 can include copper-based communications devices and cabling, fiber optic devices and cabling, wireless devices, and so on, or any suitable combination thereof.

The storage system 104 can be connected either directly to the storage drives 106, or indirectly through an optional network infrastructure 144. The network infrastructure 144 can include an Ethernet network, an InfiniBand network, a Fiber Channel (FC) network, or any other suitable network. As shown in FIG. 1, the storage system 104 can include a communications interface 110, processing circuitry 112, and a memory 114. The communications interface 110 can include an Ethernet interface, an InfiniBand interface, an FC interface, or any other suitable communications interface. The communications interface 110 can further include SCSI target adapters, network interface adapters, or any other suitable adapters, for converting electronic, optical, or wireless signals received over the network(s) 108 to a form suitable for use by the processing circuitry 112. The processing circuitry 112 (e.g., central processing unit (CPU)) can include a set of processing cores (e.g., CPU cores) configured to execute specialized code, modules, and/or logic as program instructions out of the memory 114, process storage IO requests (e.g., write requests, read requests) issued by the storage clients 102.1, ..., 102.n, and store datasets (e.g., data pages) on the storage drives 106 within the storage environment 100, which can be a RAID (Redundant Array of Independent Disks) environment.

The memory 114 can include volatile memory such as random access memory (RAM) or any other suitable volatile memory, and nonvolatile memory such as nonvolatile RAM (NVRAM) or any other suitable nonvolatile memory. The memory 114 can accommodate a variety of specialized software constructs, including a namespace layer 116, a mapping layer 118, a virtualization layer 120, and a physical layer 122. The memory 114 can also accommodate an operating system (OS) 124, such as a Linux OS, Unix OS, Windows OS, or any other suitable OS, as well as specialized software code, modules, and/or logic, including deduplication ("dedupe") logic 126. The dedupe logic 126 can operate on received data pages in association with an in-memory dedupe index 128, a dedupe log 130, and an on-demand address bag data structure ("address bag") 132. The storage drives 106 can maintain stored data pages 134 and an on-drive dedupe index 136 on one or more of the storage drives (e.g., SSDs, HDDs) 106. For example, in response to the in-memory dedupe index 128 reaching a specified fullness threshold, "dirty" index entries can be destaged from the in-memory dedupe index 128, merged with index entries in the on-drive dedupe index 136, and deleted or removed from the in-memory dedupe index 128. The destaged index entries in the on-drive dedupe index 136 can be marked as "clean".

The namespace layer 116 can be configured as a logical structure for organizing storage objects, such as LUs, VOLs, VVOLs, filesystems, or any other suitable storage objects. The namespace layer 116 can track logical addresses of the storage objects, including offsets into LUs or file system addresses. In one embodiment, if an LU has a maximum size of 10 gigabytes (GB), then the namespace layer 116 can provide a 10 GB logical address range to accommodate the LU. The mapping layer 118 can be configured as a logical structure for mapping the logical addresses of storage objects in the namespace layer 116 to virtual data structures in the virtualization layer 120. The mapping layer 118 can include a plurality of pointer arrays arranged as multi-level tree data structures (e.g., b-trees), a lowest level of which can include a plurality of leaf pointers.

The virtualization layer 120 can be configured as a logical structure for providing page virtualization in support of data deduplication. The virtualization layer 120 can include an aggregation of virtual large blocks (VLBs), each of which can include a plurality of virtual data structures. Each virtual data structure can contain virtual descriptor information, such as an address ("virtual address") configured to point to a location of a dataset (e.g., data page) in the physical layer 122, a reference count ("Ref_count") for keeping track of a number of leaf pointers that point to the virtual data structure, digest (e.g., hash prefix) information, and so on. The physical layer 122 can be configured as a logical structure for storing an aggregation of physical large blocks (PLBs), each of which can accommodate a plurality of compressed or uncompressed datasets (e.g., data pages). Each virtual address can point to a dataset in a PLB of the physical layer 122. It is noted that, although the physical layer 122 is described herein using the term "physical", an underlying storage drive is responsible for the actual physical storage of storage client data.

Figure 2A:
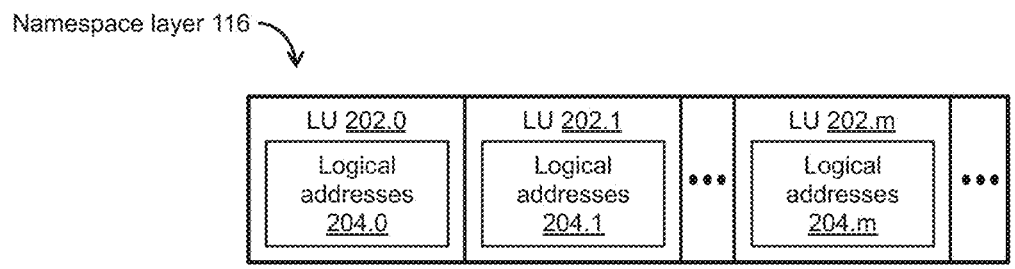
FIG. 2a is a block diagram of an exemplary namespace layer that can be implemented in the storage environment of FIG. 1.
Figure 2B:
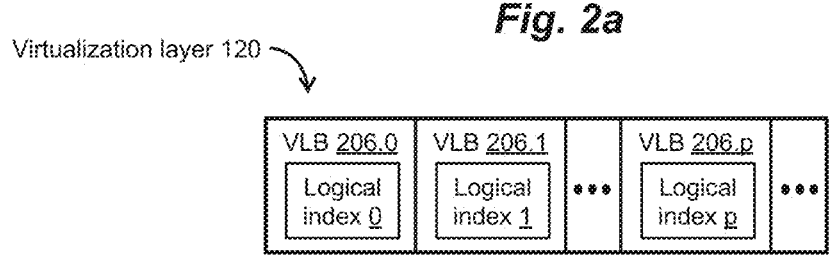
FIG. 2b is a block diagram of an exemplary virtualization layer that can be implemented in the storage environment of FIG. 1.
Figure 2C:
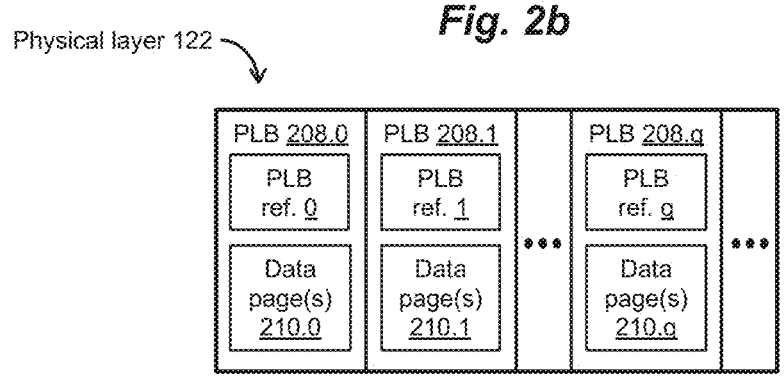
FIG. 2c is a block diagram of an exemplary physical layer that can be implemented in the storage environment of FIG. 1.

FIG. 2a, FIG. 2b, and FIG. 2c depict the namespace layer 116, the virtualization layer 120, and the physical layer 122, respectively. The namespace layer 116 (see FIG. 2a) can organize a plurality of LUs, such as an LU 202.0, an LU 202.1, and so on, up to at least an LU 202.m. The namespace layer 116 can track logical addresses of the LUs 202.0, . . . , 202.m, . . . , such as logical addresses 204.0 of the LU 202.0, logical addresses 204.1 of the LU 202.1, and so on, up to at least logical addresses 204.m of the LU 202.m. The virtualization layer 120 (see FIG. 2b) can include an aggregation of VLBs, such as a VLB 206.0, a VLB 206.1, and so on, up to at least a VLB 206.p. Each VLB 206.0, . . . , 206.p, . . . can have an associated logical index, such as a logical index "0" associated with the VLB 206.0, a logical index "1" associated with the VLB 206.1, and so on, up to at least a logical index "p" associated with the VLB 206.p. The physical layer 122 can store an aggregation of PLBs, such as a PLB 208.0, a PLB 208.1, and so on, up to at least a PLB 208.q. Each PLB 208.0, . . . , 208.q, . . . can have an associated PLB reference ("PLB ref."), such as a PLB reference "0" associated with the PLB 208.0, a PLB reference "1" associated with the PLB 208.1, and so on, up to at least a PLB reference "q" associated with the PLB 208.q. In addition, each PLB 208.0, . . . , 208.q, . . . can include at least one dataset (e.g., data page(s)), such as a data page(s) 210.0 included in the PLB 208.0, a data page(s) 210.1 included in the PLB 208.1, and so on, up to at least a data page(s) 210.q included in the PLB 208.q.

Figure 2D:
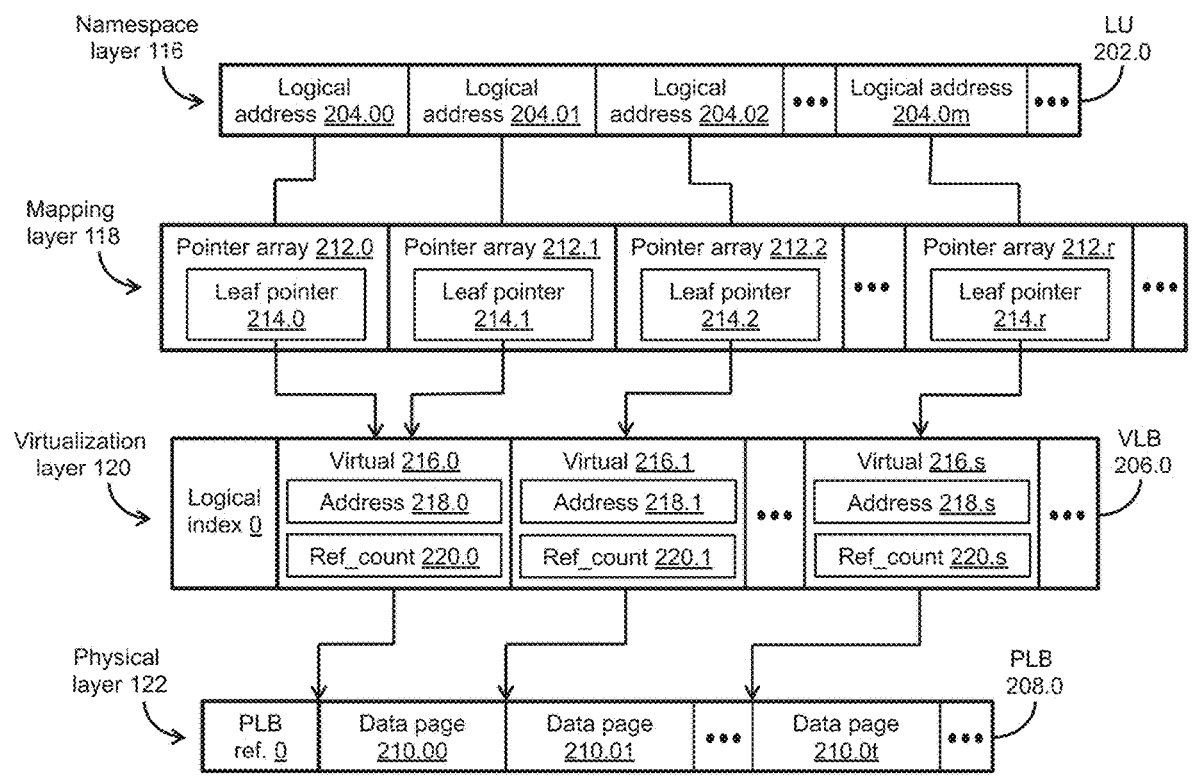
FIG. 2d is a block diagram of the namespace layer, the virtualization layer, and the physical layer of FIG. 2a, FIG. 2b, and FIG. 2c, respectively, as well as exemplary layers of indirection that can be implemented in the storage environment of FIG. 1, in which the layers of indirection include an exemplary mapping layer for accessing stored datasets in the physical layer.

FIG. 2d depicts multiple layers of indirection provided by the mapping layer 118 and the virtualization layer 120 relative to the namespace layer 116 and the physical layer 122. As shown in FIG. 2d, the namespace layer 116 includes the LU 202.0, which can have a logical address 204.00, a logical address 204.01, a logical address 204.02, and so on, up to at least a logical address 204.0m, associated therewith. For example, the logical addresses 204.00, 204.01, . . . , 204.0m, . . . may correspond to contiguous offsets into the LU 202.0. The virtualization layer 120 includes the VLB 206.0, which is associated with the logical index "0". The VLB 206.0 can include a virtual data structure ("virtual") 216.0, a virtual 216.1, and so on, up to at least a virtual 216.s. The mapping layer 118 can include a pointer array 212.0, a pointer array 212.1, a pointer array 212.2, and so on, up to at least a pointer array 212.r. The pointer array 212.0 can include a leaf pointer 214.0, the pointer array 212.1 can include a leaf pointer 214.1, the pointer array 212.2 can include a leaf pointer 214.2, and so on, up to at least the pointer array 212.r, which can include a leaf pointer 214.r. The mapping layer 118 can map the logical addresses 204.00, . . . , 204.0m, . . . of the LU 202.0 to the virtuals 216.0, . . . , 216.s, . . . of the VLB 206.0. For example, the leaf pointer 214.0 and the leaf pointer 214.1 may each point to the virtual 216.0, the leaf pointer 214.2 may point to the virtual 216.1, and so on, up to at least the leaf pointer 214.r, which may point to the virtual 216.s. The physical layer 122 includes the PLB 208.0, which is associated with the PLB reference ("PLB ref.") "0". The PLB 208.0 can include a data page 210.00, a data page 210.01, and so on, up to at least a data page 210.0t.

As described herein, the virtualization layer 120 can be configured to provide page virtualization in support of data deduplication. Such page virtualization is illustrated by the logical addresses 204.00, 204.01 of the LU 202.0 being mapped, by the mapping layer 118, to the same virtual 216.0 of the VLB 206.0, indicating that the logical addresses 204.00, 204.01 correspond to a deduplicable data page, namely, the data page 210.00. As shown in FIG. 2d, the logical address 204.02 of the LU 202.0 is mapped, by the mapping layer 118, to the virtual 216.1 of the VLB 206.0, indicating that the logical address 204.02 corresponds to a non-deduplicable (or "unique") data page, namely, the data page 210.01. Further, the logical address 204.0m of the LU 202.0 is mapped, by the mapping layer 118, to the virtual 216.s of the VLB 206.0, indicating that the logical address 204.0m also corresponds to a non-deduplicable (or "unique") data page, namely, the data page 210.0t.

To support data deduplication, the virtual 216.0 can contain virtual descriptor information, including an address ("virtual address") 218.0, and a reference count ("Ref_count") 220.0 that keeps track of the number of leaf pointers pointing to the virtual 216.0. As illustrated in FIG. 2d, the virtual address 218.0 can be configured to point to a location of the data page 210.00 in the PLB 208.0. Further, because the two (2) leaf pointers 214.0, 214.1 point to the same virtual 216.0, the Ref_count 220.0 can be equal to "2". Likewise, the virtual 216.1 can contain virtual descriptor information, including an address ("virtual address") 218.1, and a reference count ("Ref_count") 220.1 that keeps track of the number of leaf pointers pointing to the virtual 216.1. As illustrated in FIG. 2d, the virtual address 218.1 can be configured to point to a location of the data page 210.01 in the PLB 208.0. Further, because only the leaf pointer 214.2 points to the virtual 216.1, the Ref_count 220.1 can be equal to "1". In addition, the virtual 216.s can contain virtual descriptor information, including an address ("virtual address") 218.s, and a reference count ("Ref_count") 220.s that keeps track of the number of leaf pointers pointing to the virtual 216.s. As illustrated in FIG. 2d, the virtual address 218.s can be configured to point to a location of the data page 210.Ot in the PLB 208.0. Further, because only the leaf pointer 214.r points to the virtual 216.s, the Ref_count 220.s can be equal to "1". When the virtual descriptor information contained in the virtuals 216.0, 216.1, . . . , 216.s is updated (e.g., due to reference counts being incremented or decremented), the updates can be stored or logged in the dedupe log 130 in association with a unique sequence identifier (ID).

Figures 3A, 3B:
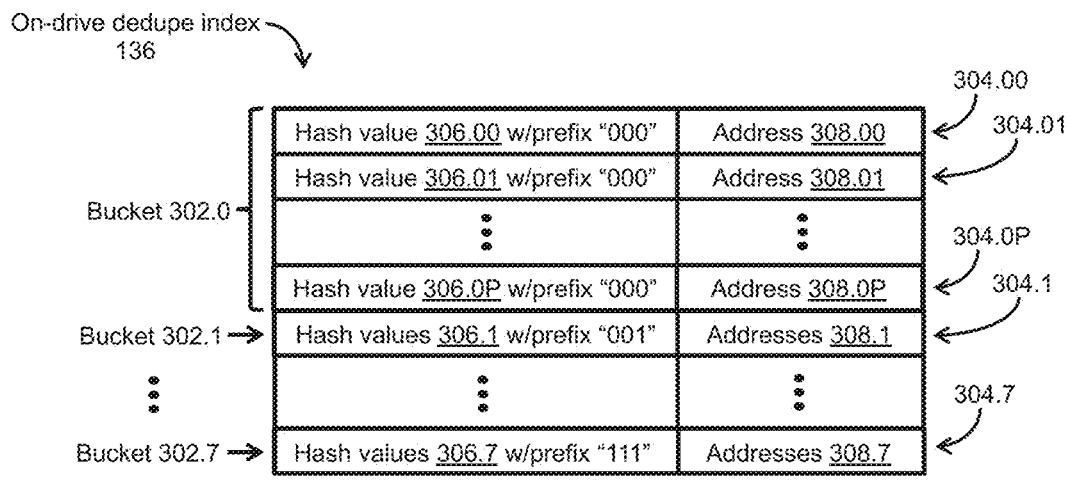

FIG. 3a depicts an exemplary implementation of the on-drive dedupe index 136 of FIG. 1. As shown in FIG. 3a, the on-drive dedupe index 136 can include a plurality of index entries, each of which can include a digest (e.g., hash value; SHA-1) of one of the stored data pages 134, and an address (e.g., virtual address) associated with a location where the data page is stored. In one embodiment, each index entry can be implemented as a key-value pair (e.g., <hash value, virtual address>). In one embodiment, each hash value can be a multi-bit value (e.g., sixty-four (64) bits), in which a specified number of most significant bits (MSBs) (e.g., up to thirty-two (32) MSBs) can be designated as a prefix of the hash value ("hash prefix"). For example, an index entry 304.00 may include a hash value 306.00 of a data page, and a virtual address 308.00 where the data page is stored; an index entry 304.01 may include a hash value 306.01 of a data page, and a virtual address 308.01 where the data page is stored; and so on, up to and including an index entry 304.0P, which may include a hash value 306.0P of a data page, and a virtual address 308.0P where the data page is stored. Further, index entries 304.1 may include hash values 306.1 of data pages, and virtual addresses 308.1 where the data pages are stored, and so on, up to and including index entries 304.7, which may include hash values 306.7 of data pages, and virtual addresses 308.7 where the data pages are stored. The plurality of index entries 304.00-304.0P, 304.1, . . . , 304.7 can be assigned to a plurality of data buckets ("buckets") 302.0, 302.1, . . . , 302.7, each of which can be based on, identified by, or defined by, a prefix of hash values included in the index entries. For example, the index entries 304.00, 304.01, . . . , 304.0P that include the hash values 306.00, 306.01, . . . , 306.0P with a 3-bit hash prefix "000" may be assigned to the bucket 302.0 defined by the hash prefix "000". Further, the index entries 304.1 including the hash values 306.1 with a 3-bit hash prefix "001" may be assigned to the bucket 302.1 defined by the hash prefix "001", and so on, up to and including the index entries 304.7, which include the hash values 306.7 with a 3-bit hash prefix "111" that may be assigned to the bucket 302.7 defined by the hash prefix "111".

As described herein, the dedupe logic 126 (see FIG. 1) can operate on received data pages in association with the in-memory dedupe index 128, the dedupe log 130, and the on-demand address bag 132. FIG. 3b depicts an exemplary on-demand address bag data structure ("address bag") 322, a form of which can be constructed, dynamically and on-demand, when sequentially processing each bucket 302.0, . . . , 302.7 to remove stale index entries from the on-drive dedupe index 136 (see FIG. 3a). Such stale index entries can result from stored data pages being determined invalid, e.g., due to reference counts (Ref_count) associated with the stored data pages being decremented to zero (0). For example, the on-demand address bag 322 (see FIG. 3b) may be used in the processing and removal of stale index entries from the bucket 302.0 (see FIG. 3a), in which the index entries 304.00, . . . , 304.0P include the hash values 306.00, . . . , 306.0P with the same 3-bit hash prefix, namely, "000". In one embodiment, the on-demand address bag 322 can be configured as a multiset, allowing for multiple occurrences of each of its elements. The size of the on-demand address bag 322 can be controlled by the number (#) of bits in the hash prefix. For example, an upper limit of the size of an on-demand address bag may be expressed as the maximum number of dirty index entries in the in-memory dedupe index multiplied by the following factor:

$$\frac{1}{2^{(\# \text{ of full hash bits} - \# \text{ of hash prefix bits})}}$$

As shown in FIG. 3b, the on-demand address bag 322 includes addresses 326 (e.g., virtual addresses) of invalid data pages, which have hash values 324 with the 3-bit hash prefix "000". For example, the on-demand address bag 322 may include a virtual address 326.0 of an invalid data page that has a hash value 324.0 with the 3-bit hash prefix "000", a virtual address 326.1 of an invalid data page that has a hash value 324.1 with the 3-bit hash prefix "000", and so on, up to and including a virtual address 326.Q of an invalid data page that has a hash value 324.Q with the 3-bit hash prefix "000".

During operation, for each data page associated with a reference count (Ref_count) decremented to zero (0), the processing circuitry 112 of the storage system 104 (see FIG. 1) can execute the dedupe logic 126 to store or log, in the dedupe log 130, a prefix of a hash value of the (invalid) data page, and a corresponding virtual address associated with a location where the invalid data page is stored. For example, digest (e.g., hash prefix) information may be obtained from the data page's metadata or virtual descriptor information. The processing circuitry 112 can execute the dedupe logic 126 to construct, dynamically and on-demand for each respective bucket 302.0, . . . , 302.7 of the on-drive dedupe index 136 (see FIG. 3a), an address bag, and to store, in the address bag, one or more virtual addresses from the dedupe log 130 whose corresponding hash prefix is the same as a hash prefix identifying or defining the respective bucket. The processing circuitry 112 can execute the dedupe logic 126 to remove, from the respective bucket, each index entry that includes a virtual address matching one of the virtual addresses in the address bag. Each index entry in the on-drive dedupe index 136 that includes a matching address in the address bag can be regarded as a stale index entry.

Figure 4:
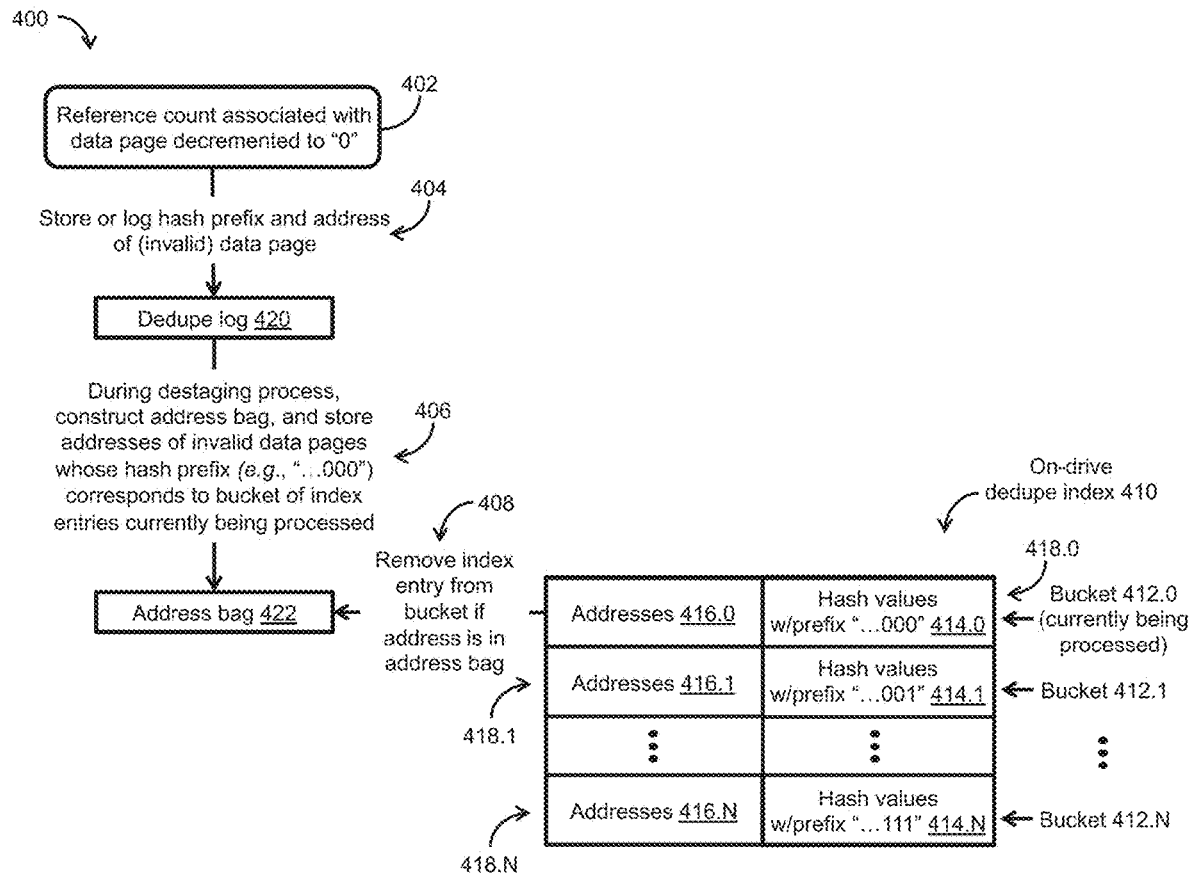
FIG. 4 is a diagram illustrating a general processing flow for removing stale index entries from an on-drive dedupe index.
Figure 5:
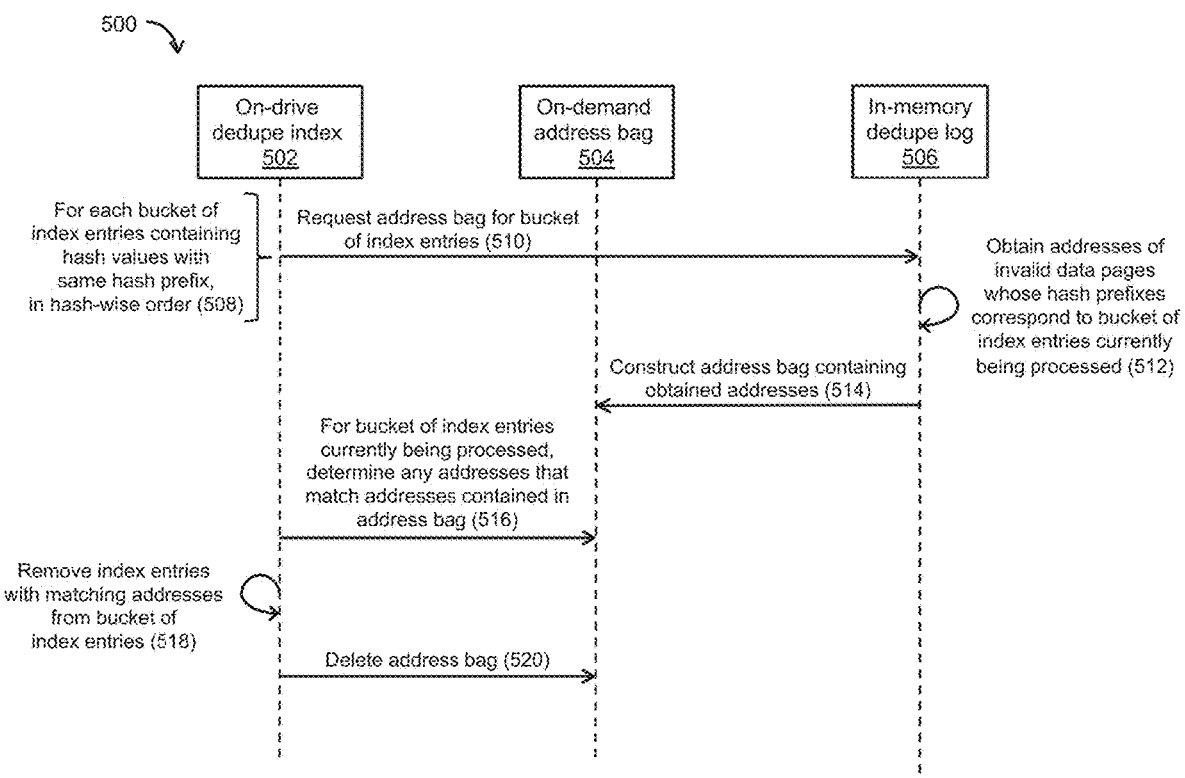
FIG. 5 is a ladder diagram illustrating a general processing sequence for removing stale index entries from an on-drive dedupe index.

The disclosed techniques for achieving efficient removal of stale index entries from on-drive dedupe indexes using hash prefix indexing will be further understood with reference to the following illustrative examples and FIGS. 4 and 5. In a first example, it is assumed that one or more data pages maintained on storage drives of a storage system are determined invalid, due to reference counts associated with the stored data pages being decremented to zero (0). Such decrementing of reference counts can result from data modifications and/or deletions occurring in the storage system relative to the stored data pages, causing the number of leaf pointers in a mapping layer (e.g., mapping layer 118; see FIG. 2d) pointing to certain virtual data structures in a virtualization layer (e.g., virtualization layer 120; see FIG. 2d) to be reduced to zero (0).

FIG. 4 depicts a general processing flow 400 that can be performed in this first example for removing stale index entries from an on-drive dedupe index 410 of the storage system. In response to an in-memory dedupe index of the storage system reaching a specified fullness threshold, dirty index entries are destaged from the in-memory dedupe index to the on-drive dedupe index 410. As shown in FIG. 4, the on-drive dedupe index 410 includes a plurality of index entries 418.0, 418.1, . . . , 418.N. The index entries 418.0 include hash values 414.0 of data pages that have a multi-bit (e.g., 20 bit) hash prefix designated as " . . . 000", and corresponding addresses (e.g., virtual addresses) 416.0 associated with locations where the data pages are stored; the index entries 418.1 include hash values 414.1 of data pages that have a multi-bit (e.g., 20 bit) hash prefix designated as " . . . 001", and corresponding addresses (e.g., virtual addresses) 416.1 associated with locations where the data pages are stored; and so on, up to and including the index entries 418.N, which include hash values 414.N of data pages that have a multi-bit (e.g., 20 bit) hash prefix designated as " . . . 111", and corresponding addresses (e.g., virtual addresses) 416.N associated with locations where the data pages are stored. As shown in FIG. 4, the index entries 418.0, 418.1, . . . , 418.N are assigned to a plurality of buckets 412.0, 412.1, . . . , 412.N based on the multi-bit prefix of the hash values included in the index entries 418.0, 418.1, . . . 418.N. Each bucket 412.0, 412.1, . . . , 412.N corresponds to a respective chunk of on-drive storage. The index entries 418.0 including the hash values 414.0 are assigned to the bucket 412.0 based on the multi-bit hash prefix " . . . 000"; the index entries 418.1 that include the hash values 414.1 are assigned to the bucket 412.1 based on the multi-bit hash prefix " . . . 001"; and so on, up to and including the index entries 418.N, which include the hash values 414.N assigned to the bucket 412.N based on the multi-bit hash prefix " . . . 111". In this way, the buckets 412.0, 412.1, . . . , 412.N identified or defined by the multi-bit hash prefixes " . . . 000", " . . . 001", . . . , " . . .

111", respectively, are effectively sorted "hash-wise" across respective chunks of on-drive storage.

In this first example, for each stored data page whose associated reference count is decremented to zero (0) (402; see FIG. 4), e.g., due to data modifications and/or deletions occurring in the storage system relative to the data page, a prefix of a hash value ("hash prefix") of the data page, and a corresponding address (e.g., virtual address) of the data page, are stored or logged (404; see FIG. 4) in a dedupe log 420 of the storage system. Because the reference count associated with the stored data page is decremented to zero (0), the data page is determined invalid. In other words, the storage system does not include any storage object (e.g., LU) that has a logical address mapped to the virtual address of the data page.

In this first example, the destaging of dirty index entries from the in-memory dedupe index to the on-drive dedupe index 410 is a cyclical process performed iteratively and sequentially across chunks of on-drive storage, from a first chunk corresponding to the bucket 412.0 (defined by the multi-bit hash prefix " . . . 000") to a last chunk corresponding to the bucket 412.N (defined by the multi-bit hash prefix " . . . 111"). During the destaging process (or any other suitable time), an address bag data structure ("address bag") is constructed, in memory, dynamically and on-demand, for each processed bucket of the on-drive dedupe index 410. As shown in FIG. 4, when processing the first chunk corresponding to the bucket 412.0, an on-demand address bag 422 is constructed (406; see FIG. 4), and any virtual address(es) from the dedupe log 420 whose corresponding hash prefix is " . . . 000" are stored (406; see FIG. 4) in the address bag 422. As described herein, each such virtual address stored or logged in the dedupe log 420 is associated with a location where an invalid data page is stored. Having stored, in the address bag 422, one or more virtual addresses from the dedupe log 420 whose corresponding hash prefix is " . . . 000", a determination is made as to whether any of the index entries 418.0 contained in the bucket 412.0 include virtual addresses that match virtual addresses stored in the address bag 422. If any of the index entries 418.0 have matching addresses in the address bag 422, then each such index entry is regarded as a stale index entry and removed (408; see FIG. 4) from the bucket 412.0. Once all stale index entries have been removed from the bucket 412.0, the address bag 422 is deleted (or deallocated) from the memory of the storage system.

Similarly, when processing a second chunk of on-drive storage corresponding to the bucket 412.1 of the on-drive dedupe index 410, another address bag is constructed, dynamically and on-demand, and any virtual address(es) from the dedupe log 420 whose corresponding hash prefix is " . . . 001" are stored in the address bag. Having stored, in the address bag, one or more virtual addresses from the dedupe log 420 whose corresponding hash prefix is " . . . 001", a determination is made as to whether any of the index entries 418.1 contained in the bucket 412.1 include virtual addresses that match virtual addresses stored in the address bag. If any of the index entries 418.1 have matching addresses in the address bag, then each such index entry 418.1 is regarded as a stale index entry and removed from the bucket 412.1. Once all stale index entries have been removed from the bucket 412.1, the address bag is deleted (or deallocated) from the memory of the storage system. Processing is sequentially performed in a similar fashion for each remaining chunk of on-drive storage, up to and including the chunk corresponding to the bucket 412.N of the on-drive dedupe index 410, constructing an address bag for each bucket currently being processed and deleting (or deallocating) the address bag once all stale index entries have been removed from the bucket.

FIG. 5 depicts a general processing sequence 500 that can be performed in a second example for removing stale index entries from an on-drive dedupe index 502 of a storage system. In this second example, it is assumed that the on-drive dedupe index 502 includes a plurality of index entries, each of which includes a hash value of a data page having a specified prefix, and a corresponding address (e.g., virtual address) associated with a location where the data page is stored. It is further assumed that the plurality of index entries are assigned to a plurality of buckets based on the specified hash prefixes. As a result, the buckets of index entries, identified or defined by the specified hash prefixes, are effectively sorted "hash-wise" across respective chunks of on-drive storage.

In this second example, the general processing sequence 500 is performed (e.g., in hash-wise order), for each bucket of index entries containing hash values with the same hash prefix (508; see FIG. 5). As shown in FIG. 5, an address bag is requested, dynamically and on-demand, for the bucket of index entries (510; see FIG. 5). In response to the request for the address bag, addresses (e.g., virtual addresses) of invalid data pages, whose hash prefixes correspond to the bucket of index entries currently being processed, are obtained from an in-memory dedupe log 506 (512; see FIG. 5). Having obtained the addresses of invalid data pages, an on-demand address bag 504 is constructed containing the obtained addresses (514; see FIG. 5). A determination is then made as to whether any of the index entries in the bucket currently being processed include addresses that match addresses contained in the on-demand address bag 504 (516; see FIG. 5). Having determined that one or more index entries in the bucket include addresses that match addresses contained in the on-demand address bag 504, the index entries that include the matching addresses are regarded as stale index entries and removed from the bucket (518; see FIG. 5). Once all stale index entries have been removed from the bucket, the on-demand address bag 504 is deleted (520; see FIG. 5). The general processing sequence 500 is repeated (e.g., in hash-wise order), for each remaining bucket of index entries in the on-drive dedupe index 502.

Figure 6:
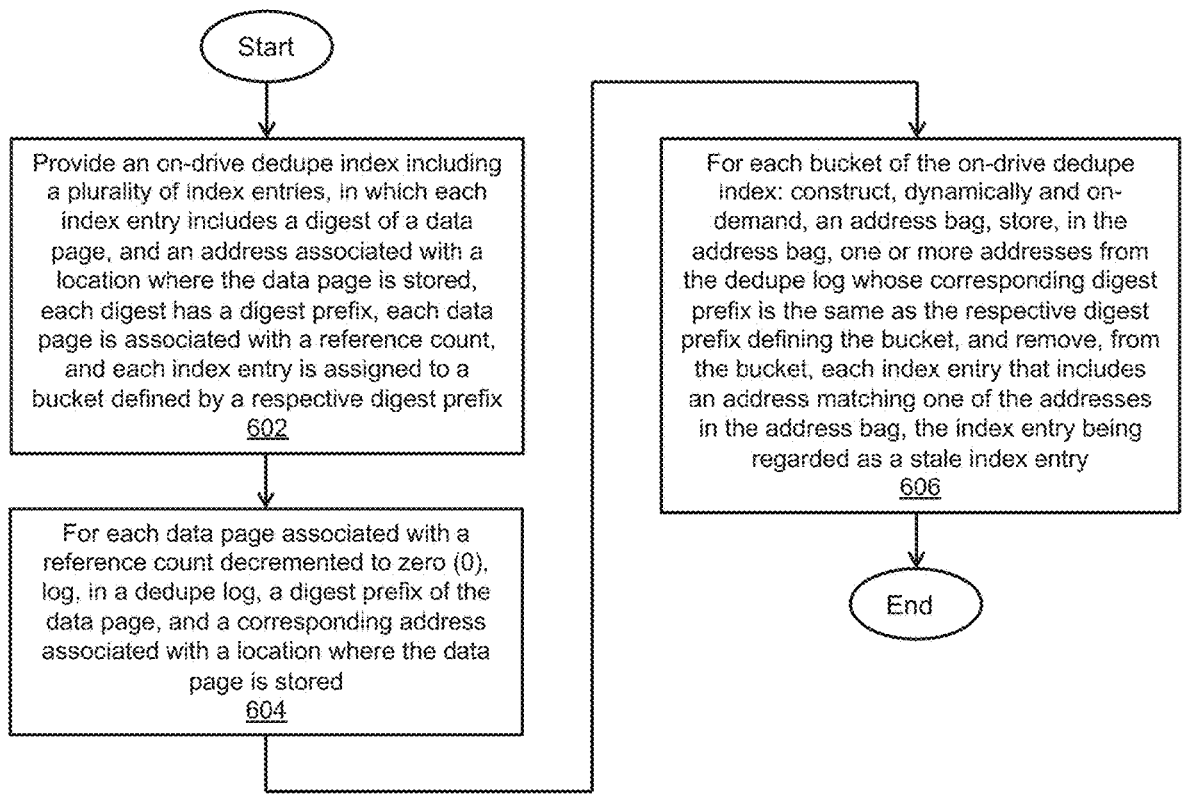
FIG. 6 is a flow diagram of an exemplary method of achieving efficient removal of stale index entries from on-drive dedupe indexes using hash prefix indexing.

An exemplary method of achieving efficient removal of stale index entries from on-drive dedupe indexes using hash prefix indexing is described below with reference to FIG. 6. As depicted in block 602, an on-drive dedupe index is provided, in which the on-drive dedupe index includes a plurality of index entries, each index entry includes a digest of a data page, and an address associated with a location where the data page is stored, each digest has a digest prefix, each data page is associated with a reference count, and each index entry is assigned to a bucket defined by a respective digest prefix. As depicted in block 604, for each data page associated with a reference count decremented to zero (0), a digest prefix of the data page, and a corresponding address associated with a location where the data page is stored, are logged in a dedupe log. As depicted in block 606, for each bucket of the on-drive dedupe index, an address bag is constructed dynamically and on-demand, one or more addresses from the dedupe log whose corresponding digest prefix is the same as the respective digest prefix defining the bucket are stored in the address bag, and each index entry that includes an address matching one of the addresses in the address bag is removed from the bucket. The index entry is regarded as a stale index entry.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client", "host", and "user" refer, interchangeably, to any person, system, or other entity that uses a storage system to read/write data.

As employed herein, the term "storage device" may refer to a storage array including multiple storage devices. Such storage devices may refer to any non-volatile memory (NVM) devices, including hard disk drives (HDDs), solid state drives (SSDs), flash devices (e.g., NAND flash devices, NOR flash devices), and/or similar devices that may be accessed locally and/or remotely, such as via a storage area network (SAN).

As employed herein, the term "storage array" may refer to a storage system used for page-based, block-based, file-based, or other object-based storage. Such a storage array may include, for example, dedicated storage hardware containing HDDs, SSDs, and/or all-flash drives.

As employed herein, the term "storage entity" may refer to a filesystem, an object storage, a virtualized device, a logical unit (LU), a logical volume (LV), a logical device, a physical device, and/or a storage medium.

As employed herein, the term "LU" may refer to a logical entity provided by a storage system for accessing data from the storage system and may be used interchangeably with a logical volume (LV). The term "LU" may also refer to a logical unit number (LUN) for identifying a logical unit, a virtual disk, or a virtual LUN.

As employed herein, the term "physical storage unit" may refer to a physical entity such as a storage drive or disk or an array of storage drives or disks for storing data in storage locations accessible at addresses. The term "physical storage unit" may be used interchangeably with the term "physical volume".

As employed herein, the term "storage medium" may refer to a hard drive or flash storage, a combination of hard drives and flash storage, a combination of hard drives, flash storage, and other storage drives or devices, or any other suitable types and/or combinations of computer readable storage media. Such a storage medium may include physical and logical storage media, multiple levels of virtual-to-physical mappings, and/or disk images. The term "storage medium" may also refer to a computer-readable program medium.

As employed herein, the term "IO request" or "IO" may refer to a data input or output request such as a write request or a read request.

As employed herein, the terms, "such as", "for example", "e.g.", "exemplary", and variants thereof refer to non-limiting embodiments and have meanings of serving as examples, instances, or illustrations. Any embodiments described herein using such phrases and/or variants are not necessarily to be construed as preferred or more advantageous over other embodiments, and/or to exclude incorporation of features from other embodiments.

As employed herein, the term "optionally" has a meaning that a feature, element, process, etc., may be provided in certain embodiments and may not be provided in certain other embodiments. Any particular embodiment of the present disclosure may include a plurality of optional features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method comprising:
   providing or making accessible an on-drive deduplication ("dedupe") index, the on-drive dedupe index including a plurality of index entries, each index entry including a digest of a data page and an address associated with a location where the data page is stored, each digest having a digest prefix, each data page being associated with a reference count, each index entry being assigned to a bucket data structure ("bucket") defined by a respective digest prefix;
   for each data page associated with a reference count decremented to zero (0), logging, in a dedupe log, a digest prefix of the data page and a corresponding address associated with a location where the data page is stored; and
   for each bucket of the on-drive dedupe index:
      constructing, dynamically and on-demand, an address bag data structure ("address bag");
      storing, in the address bag, one or more addresses from the dedupe log whose corresponding digest prefix is the same as the respective digest prefix defining the bucket; and
      removing, from the bucket, each index entry that includes an address matching one of the addresses in the address bag, the index entry being regarded as a stale index entry.

2. The method of claim 1 comprising:
   having removed, from the bucket, each index entry that includes an address matching one of the addresses in the address bag, deleting or deallocating the address bag from memory.

3. The method of claim 1 wherein the logging of the digest prefix of the data page and the corresponding address associated with the location where the data page is stored includes logging, in the dedupe log, the digest prefix of the data page and a corresponding virtual address associated with the location where the data page is stored.

4. The method of claim 1 wherein a destaging process includes, in response to an in-memory dedupe index reaching a specified fullness threshold, destaging the plurality of index entries from the in-memory dedupe index to the on-drive dedupe index, and wherein the constructing of the address bag, the storing of the addresses in the address bag, and the removing of the index entry from the bucket are performed during the destaging process.

5. The method of claim 4 wherein the plurality of index entries include a plurality of digests, respectively, the plurality of digests having a plurality of digest prefixes, respectively, wherein the plurality of index entries are assigned to a plurality of buckets defined by the plurality of digest prefixes, respectively, and wherein the method comprises:
   ordering the plurality of buckets according to the plurality of digest prefixes defining the respective buckets.

6. The method of claim 5 comprising:
   performing the destaging process iteratively and sequentially across the ordered plurality of buckets.

7. A system comprising:
a memory; and
processing circuitry configured to execute program instructions out of the memory to:
provide or make accessible an on-drive deduplication ("dedupe") index, the on-drive dedupe index including a plurality of index entries, each index entry including a digest of a data page and an address associated with a location where the data page is stored, each digest having a digest prefix, each data page being associated with a reference count, each index entry being assigned to a bucket data structure ("bucket") defined by a respective digest prefix;
for each data page associated with a reference count decremented to zero (0), log, in a dedupe log, a digest prefix of the data page and a corresponding address associated with a location where the data page is stored; and
for each bucket of the on-drive dedupe index:
construct, dynamically and on-demand, an address bag data structure ("address bag");
store, in the address bag, one or more addresses from the dedupe log whose corresponding digest prefix is the same as the respective digest prefix defining the bucket; and
remove, from the bucket, each index entry that includes an address matching one of the addresses in the address bag, the index entry being regarded as a stale index entry.

8. The system of claim 7 wherein the processing circuitry is configured to execute the program instructions out of the memory, having removed, from the bucket, each index entry that includes an address matching one of the addresses in the address bag, to delete or deallocate the address bag from memory.

9. The system of claim 7 wherein the processing circuitry is configured to execute the program instructions out of the memory to log, in the dedupe log, the digest prefix of the data page and a corresponding virtual address associated with the location where the data page is stored.

10. The system of claim 7 wherein the processing circuitry is configured to execute the program instructions out of the memory to perform a destaging process including, in response to an in-memory dedupe index reaching a specified fullness threshold, destaging the plurality of index entries from the in-memory dedupe index to the on-drive dedupe index, and wherein constructing of the address bag, storing of the addresses in the address bag, and removing of the index entry from the bucket are performed during the destaging process.

11. The system of claim 10 wherein the plurality of index entries include a plurality of digests, respectively, the plurality of digests having a plurality of digest prefixes, respectively, wherein the plurality of index entries are assigned to a plurality of buckets defined by the plurality of digest prefixes, respectively, and wherein the processing circuitry is configured to execute the program instructions out of the memory to order the plurality of buckets according to the plurality of digest prefixes defining the respective buckets.

12. The system of claim 11 wherein the processing circuitry is configured to execute the program instructions out of the memory to perform the destaging process iteratively and sequentially across the ordered plurality of buckets.

13. The system of claim 7 wherein the stale index entry corresponds to a data page determined invalid such that the system does not include any storage object having a logical address mapped to an address of the data page.

14. The system of claim 7 wherein the processing circuitry is configured to execute the program instructions out of the memory to determine a size of the address bag based on a number of bits in the respective digest prefix defining the bucket.

15. A computer program product including a set of non-transitory, computer-readable media having program instructions that, when executed by processing circuitry, cause the processing circuitry to perform a method comprising:
providing or making accessible an on-drive deduplication ("dedupe") index, the on-drive dedupe index including a plurality of index entries, each index entry including a digest of a data page and an address associated with a location where the data page is stored, each digest having a digest prefix, each data page being associated with a reference count, each index entry being assigned to a bucket data structure ("bucket") defined by a respective digest prefix;
for each data page associated with a reference count decremented to zero (0), logging, in a dedupe log, a digest prefix of the data page and a corresponding address associated with a location where the data page is stored; and
for each bucket of the on-drive dedupe index:
constructing, dynamically and on-demand, an address bag data structure ("address bag");
storing, in the address bag, one or more addresses from the dedupe log whose corresponding digest prefix is the same as the respective digest prefix defining the bucket; and
removing, from the bucket, each index entry that includes an address matching one of the addresses in the address bag, the index entry being regarded as a stale index entry.

16. The computer program product of claim 15 wherein the method comprises:
having removed, from the bucket, each index entry that includes an address matching one of the addresses in the address bag, deleting or deallocating the address bag from memory.

17. The computer program product of claim 15 wherein the logging of the digest prefix of the data page and the corresponding address associated with the location where the data page is stored includes logging, in the dedupe log, the digest prefix of the data page and a corresponding virtual address associated with the location where the data page is stored.

18. The computer program product of claim 15 wherein a destaging process includes, in response to an in-memory dedupe index reaching a specified fullness threshold, destaging the plurality of index entries from the in-memory dedupe index to the on-drive dedupe index, and wherein the constructing of the address bag, the storing of the addresses in the address bag, and the removing of the index entry from the bucket are performed during the destaging process.

19. The computer program product of claim 18 wherein the plurality of index entries include a plurality of digests, respectively, the plurality of digests having a plurality of digest prefixes, respectively, wherein the plurality of index entries are assigned to a plurality of buckets defined by the plurality of digest prefixes, respectively, and wherein the method comprises:
ordering the plurality of buckets according to the plurality of digest prefixes defining the respective buckets.

20. The computer program product of claim 19 wherein the method comprises:
performing the destaging process iteratively and sequentially across the ordered plurality of buckets.

\* \* \* \* \*